US007431476B2

(12) United States Patent
Holst

(10) Patent No.: US 7,431,476 B2
(45) Date of Patent: Oct. 7, 2008

(54) COLD CATHODE FLUORESCENT LAMP

(75) Inventor: Barrie James Holst, Baulklam Hills (AU)

(73) Assignee: Bright Group Pty Limited, Silverwater (AU)

( * ) Notice: Subject to any disclaimer, the term of this patent is extended or adjusted under 35 U.S.C. 154(b) by 496 days.

(21) Appl. No.: 10/931,760

(22) Filed: Sep. 1, 2004

(65) Prior Publication Data

US 2005/0212399 A1 Sep. 29, 2005

(30) Foreign Application Priority Data

Mar. 26, 2004 (AU) .............................. 2004901653
Jul. 6, 2004 (AU) .............................. 2004903720

(51) Int. Cl.
*B60Q 1/26* (2006.01)

(52) U.S. Cl. ....................... 362/227; 362/216; 362/260; 313/493; 313/634

(58) Field of Classification Search ................. 362/227, 362/216, 260; 313/493, 634
See application file for complete search history.

(56) References Cited

U.S. PATENT DOCUMENTS 4,458,301 A * 7/1984 Chapman et al. .............. 315/51
6,043,600 A * 3/2000 Sica ........................... 313/493
6,175,187 B1 * 1/2001 Tsutsui ....................... 313/493
7,045,946 B2 * 5/2006 Kawase et al. .............. 313/493
2005/0110387 A1 * 5/2005 Landry ....................... 313/489

FOREIGN PATENT DOCUMENTS

| | | |
|---|---|---|
| GB | 369558 | 3/1932 |
| JP | 5-89834 | 4/1993 |
| JP | 2000-348677 | 12/2000 |
| JP | 2004-335297 | 11/2004 |

* cited by examiner

*Primary Examiner*—Stephen F. Husar
*Assistant Examiner*—Jessica L McMillan
(74) *Attorney, Agent, or Firm*—Pearne & Gordon LLP

(57) ABSTRACT

A cold cathode fluorescent lamp (10) is configured generally as a trapezium having first (11), second (12), third (13) and fourth (14) sides, the lamp (10) has a first end (15) adapted to be connected to an electric supply and a second end (16) adapted to be connected to the electric supply, the first and third sides (11 and 13) being generally parallel to one another and running in opposite directions, the second side (12) extending between the first and third sides (11 and 13) and not at right angles to either the first side (11) or the third side (13), and the fourth side (14) being defined by a first portion (17) extending from the third side (13), a second portion (18) of generally inverted U-shape extending towards the second side (12) and a third portion (19) extending from the second portion (18) towards the first side (11).

16 Claims, 3 Drawing Sheets

COLD CATHODE FLUORESCENT LAMP

This invention relates to cold cathode fluorescent lamps and more particularly to cold cathode fluorescent lamps specifically designed to illuminate planar screens such as the display screens of electronic gaming machines and the like.

Cold cathode fluorescent lamps are usually supplied as elongated lamps or circular lamps, each of which has specific application of use within inherent limitations as to the intensity of light for a specific area.

There is a need, therefore, for a cold cathode fluorescent lamp of different configuration which is capable of producing an improved intensity of light over a specific area.

According to one aspect of the invention there is provided a cold cathode fluorescent lamp configured generally as a trapezium having first, second, third and fourth sides, the lamp having a first end adapted to be connected to an electric supply and a second end adapted to be connected to the electric supply, the first and third sides being generally parallel to one another and running in opposite directions, the second side extending between the first and third sides and not at right angles to either the first side or the third side, and the fourth side being defined by a first portion extending from the third side, a second portion of generally inverted U-shape extending towards the second side and a third portion extending from the second portion towards the first side.

According to another aspect of the invention there is provided a cold cathode fluorescent lamp comprising an elongated cold cathode fluorescent tube having a first end adapted to be connected to an electric supply and a second end adapted to be connected to the electric supply, the elongated tube being configured to define a perimeter of the lamp which comprises:—

(i) a first run from the first end, (ii) a second run extending at an angle greater than 90° from the first run, (iii) a third run extending from the second run and generally parallel to and in the reverse direction to the first run, (iv) a fourth run extending from the third run at an angle greater than 90° and generally towards the first end, (v) a fifth run extending from the fourth run generally parallel to and in the reverse direction of the third run, (vi) a sixth run extending from the fifth run generally parallel to the fourth run and extending towards the first run, (vii) a seventh run extending from the sixth run generally parallel to and in the opposite direction to the fifth run, and (viii) an eighth run extending from the seventh run generally in the direction of the fourth run towards the first run and terminating in the second end which is adjacent to the first end.

In order that the invention may be more readily understood and put into practical effect, reference will now be made to the accompanying drawings in which:—

Figure 1:
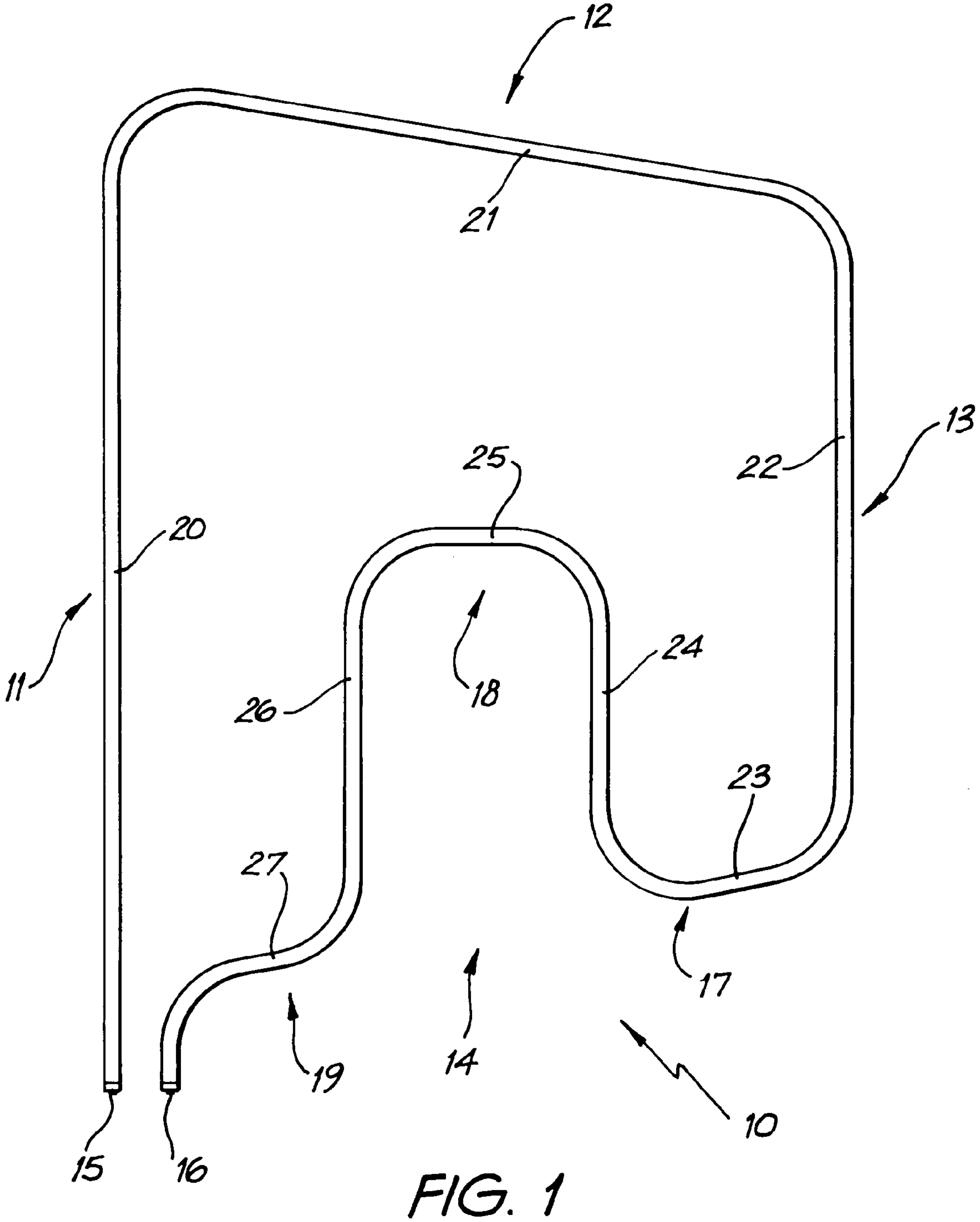
Figure 2:
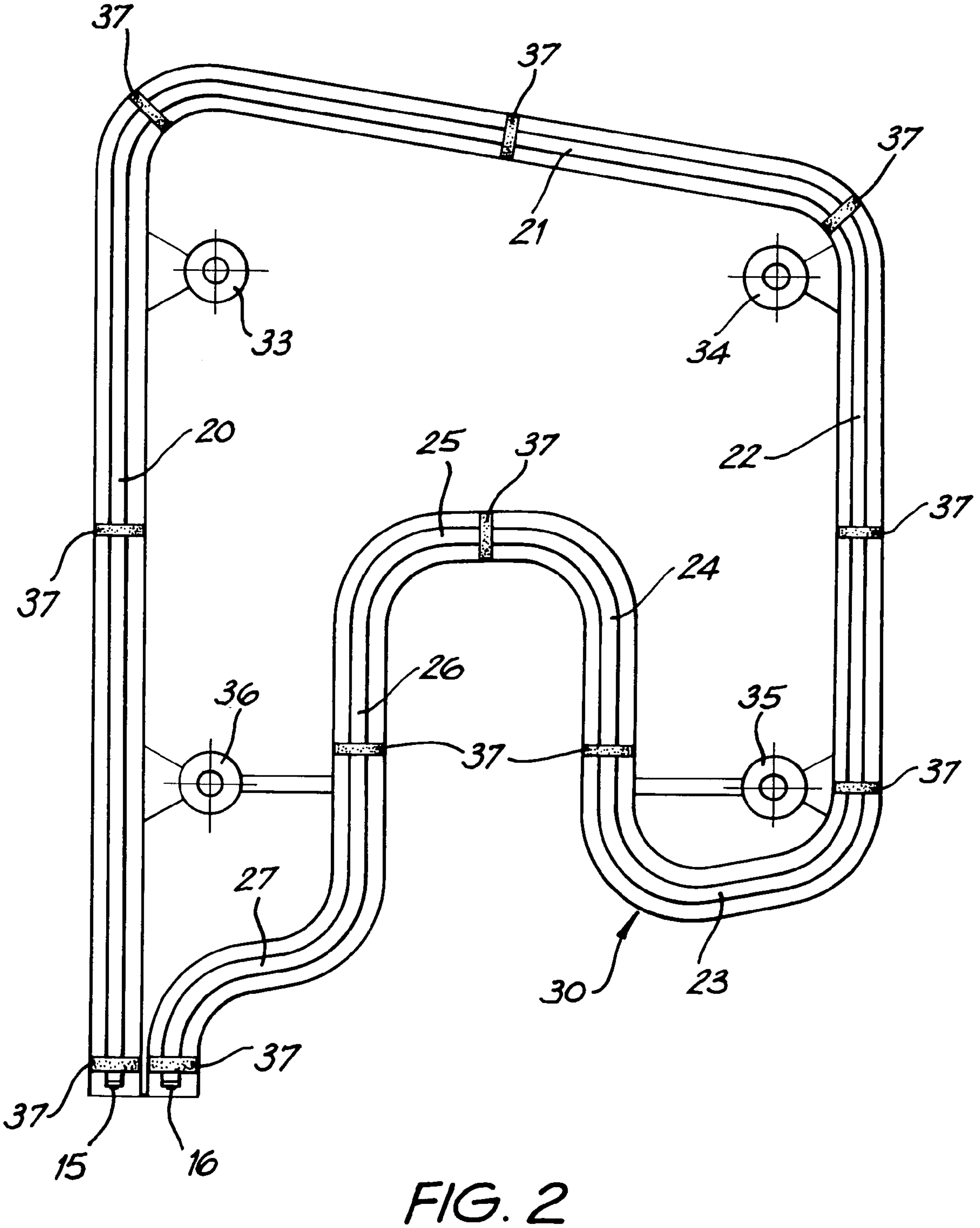
Figure 3:
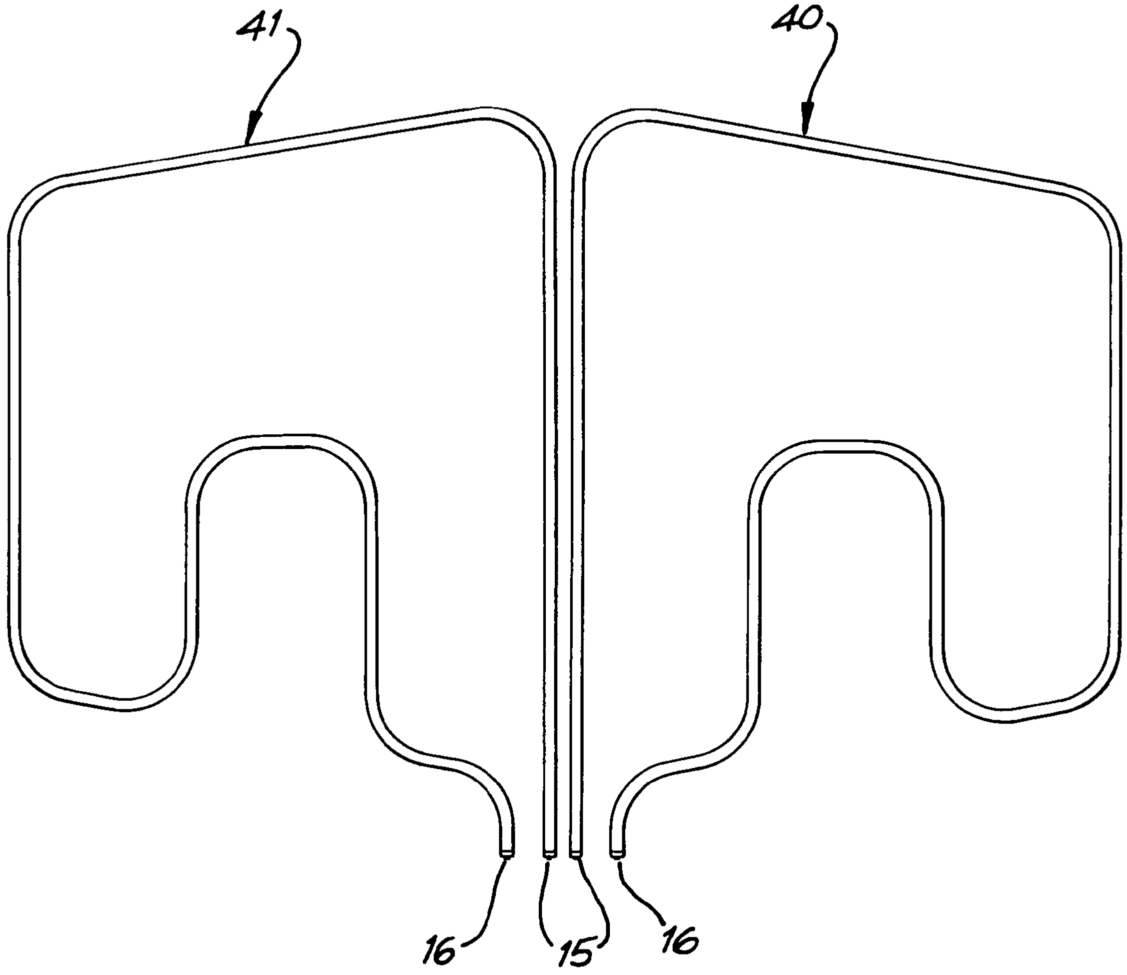

FIG. 1 is a plan view of a cold cathode fluorescent lamp according to one embodiment of the invention, FIG. 2 is a view similar to FIG. 1 with the cold cathode fluorescent lamp encased within a cover, and FIG. 3 is a plan view of two cold cathode fluorescent lamps of FIG. 1 mounted together to provide a generally rectangular source of light.

The cold cathode fluorescent lamp 10 shown in FIG. 1 is configured generally as a trapezium having a first side 11, a second side 12, a third side 13, a fourth side 14, a first terminal 15 and a second terminal 16.

As shown in FIG. 1, the first and third sides 11 and 13 are generally parallel to one another with the third side being shorter than the first side but the reverse could be the case. The second side 12 extends between the first side 11 and the third side 13 and is inclined to both the first side 11 and the second side 13.

The fourth side 14 consists of three portions 17, 18 and 19. The first portion 17 extends from the third side 13, the second portion 18 is of generally inverted U-shape and extends towards the second side 12 and the third portion 19 extends from the second portion 18 towards the first side and terminates in the terminal 16.

The first side 11 constitutes a first run 20 of the fluorescent tube 10, the second side 12 constitutes a second run 21 and the third side 13 constitutes a third run 22 which is generally parallel to the first run 20.

The fourth run 23 extends from the third run 22 at an angle greater than 90° and generally towards the first run 20, the fifth run 24 extends from the fourth run 23 and is generally parallel to and in the reverse direction of the third run 22. The sixth run 25 extends from the fifth run 24 and is generally parallel to and running in the same direction as the fourth run 23 towards the first run 20. The seventh run 26 extends from the sixth run generally parallel to and in the reverse direction to the fifth run 24. The eighth run 27 extends from the seventh run 26 in the general direction of the fourth run 23 towards the first run 20 and terminates in the terminal 16 which is adjacent to the terminal 15.

The purpose of the U-shape portion 18 is to provide intensity of light in the central portion of the trapezium. As is well known in the art, the terminals 15 and 16 may be connected to an inverter which in turn is connected to the twelve and twenty four volt supply of a gaming machine.

The shape and configuration of the lamp 10 is designed to provide even illumination to a wide range of signage applications.

As shown in FIG. 2, the tube 10 is mounted between a two part mounting cover/diffuser 30 which is injection moulded from frosted acrylic plastic as mirror images. The translucent finish is applied during the injection moulding process and provides a diffuser to better distribute the intense light emanating from the cold cathode fluorescent lamp. Around the periphery of the cover 30 there is a channel 31 for receiving the tube 10 and spaced around the channel 31 there is a number of foam O rings 37 to support the tube within the acrylic cover 30. Bosses 33, 34, 35 and 36 have central apertures for receiving fasteners adapted to secure the lamp assembly at its place of use. In this instance, the bosses 33, 34, 35 and 36 are located centrally within the overall dimension of the lamp 10 and are equally spaced apart to provide versatility in relation to the mounting of the lamp.

The protective cover provides a vibration resistant mounting with mechanical strength. The cover also acts as a diffuser to distribute the high intensity light. The diffuser is moulded in a clear acrylic material which is doped with an opaque white colour additive to produce a high intensity bright white translucent light.

As shown in FIG. 3, a first lamp 40 is mounted in the same configuration as the lamp shown in FIGS. 1 and 2 and adjacent thereto is a similar lamp 41 which has been inverted so that overall the two lamps 40 and 41 provide a generally rectangular source of light. The lamps 40 and 41 may be arranged in other configurations such as round, oval, square and rectangular, mounted on light collimating or distributing tiles and powered in multiples to evenly distribute light over the larger signage applications.

The trapezium is specifically designed to accommodate the lighting intensity and distribution requirements of a wide range of signage shapes and sizes. The trapezium is rotated and arranged in various multiples to achieve round, oval, rectangular and square lighting applications. The trapezium is also mounted on a CCFL reflector/mounting tile which is specifically designed to be inverted to either distribute or collimate the light produced by the CCFL. The mounting/reflector tiles can also be rotated in conjunction with the CCFL to achieve the shape and size variations to accommodate the various signage applications.

Various modifications may be made in details of design, shape and configuration of the lamp without departing from the scope and ambit of the invention.

The invention claimed is:

1. A cold cathode fluorescent lamp configured substantially as a trapezium having first, second, third and fourth sides, the lamp having a first end adapted to be connected to an electric supply and a second end adapted to be connected to the electric supply, the first and third sides being generally parallel to one another and running in opposite directions, the second side extending between the first and third sides and not at right angles to either the first side or the third side, and the fourth side being defined by a first portion extending from the third side, a second portion of generally inverted U-shape extending towards the second side and a third portion extending from the second portion towards the first side.

2. A cold cathode fluorescent lamp comprising an elongated cold cathode fluorescent tube having a first end adapted to be connected to an electric supply and a second end adapted to be connected to the electric supply, the elongated tube being configured to define a perimeter of the lamp which comprises:

(i) a first run from the first end, (ii) a second run extending at an angle greater than 90° from the first run, (iii) a third run extending from the second run and substantially parallel to and in the reverse direction to the first run, (iv) a fourth run extending from the third run at an angle greater than 90° and substantially towards the first end, (v) a fifth run extending from the fourth run substantially parallel to and in the reverse direction of the third run, (vi) a sixth run extending from the fifth run substantially parallel to the fourth run and extending towards the first run, (vii) a seventh run extending from the sixth run substantially parallel to and in the opposite direction to the fifth run, and (viii) an eighth run extending from the seventh run substantially in the direction of the fourth run towards the first run and terminating in the second end which is adjacent to the first end.

3. A lamp assembly comprising a cold cathode fluorescent lamp configured substantially as a trapezium having first, second, third and fourth sides, the lamp having a first end adapted to be connected to an electric supply and a second end adapted to be connected to the electric supply, the first and third sides being substantially parallel to one another and running in opposite directions, the second side extending between the first and third sides and not at right angles to either the first or the third side, and the fourth side being defined by a first portion extending from the third side, a second portion of substantially inverted U-shape extending towards the second side and a third portion extending from the second portion towards the first side, and, a two part mounting cover between which the fluorescent lamp is located.

4. A lamp assembly according to claim 3 wherein the two part mounting cover is injection moulded from frosted acrylic plastic as mirror images.

5. A lamp assembly according to claim 4 wherein the mounting covers have a translucent finish to provide a diffuser that distributes the light emanating from the cold cathode fluorescent lamp.

6. A lamp assembly according to claim 3 wherein the mounting cover parts have a channel adjacent their peripheries in which the fluorescent lamp is located.

7. A lamp assembly according to claim 6 and further including a plurality of O-rings spaced around the channel adapted to support the fluorescent tube.

8. A lamp assembly according to claim 7 wherein each part of the mounting cover has a plurality of mating bosses within the area bounded by the channel, the mating bosses each having an aperture for receiving a fastener adapted to mount the lamp assembly.

9. A lamp assembly according to claim 8 wherein there are four mating bosses which are equally spaced from one another.

10. A lamp assembly comprising a cold cathode fluorescent lamp comprising an elongated cold cathode fluorescent tube having a first end adapted to be connected to an electric supply and a second end adapted to be connected to the electric supply, the elongated tube being configured to define a perimeter of the lamp which comprises:

(i) a first run from the first end, (ii) a second run extending at an angle greater than 90° from the first run, (iii) a third run extending from the second run and substantially parallel to and in the reverse direction to the first run, (iv) a fourth run extending from the third run at an angle greater than 90° and substantially towards the first end, (v) a fifth run extending from the fourth run substantially parallel to and in the reverse direction of the third run, (vi) a sixth run extending from the fifth run substantially parallel to the fourth run and extending towards the first run, (vii) a seventh run extending from the sixth run substantially parallel to and in the opposite direction to the fifth run, and (viii) an eighth run extending from the seventh run substantially in the direction of the fourth run towards the first run and terminating in the second end which is adjacent to the first end, and, a two part mounting cover between which the fluorescent lamp is located.

11. A lamp assembly according to claim 10 wherein the two part mounting cover is injection moulded from frosted acrylic plastic as mirror images.

12. A lamp assembly according to claim 11 wherein the mounting covers have a translucent finish to provide a diffuser that distributes the light emanating from the cold cathode fluorescent lamp.

13. A lamp assembly according to claim 10 wherein the mounting cover parts have a channel adjacent their peripheries in which the fluorescent lamp is located.

14. A lamp assembly according to claim 13 and further including a plurality of O-rings spaced around the channel adapted to support the fluorescent tube.

15. A lamp assembly according to claim 13 wherein each part of the mounting cover has a plurality of mating bosses within the area bounded by the channel, the mating bosses each having an aperture for receiving a fastener adapted to mount the lamp assembly.

16. A lamp assembly according to claim 15 wherein there are four mating bosses which are equally spaced from one another.

* * * * *